United States Patent [19]
Cipriani

[11] Patent Number: 5,967,704
[45] Date of Patent: Oct. 19, 1999

[54] PNEUMATIC APPARATUS FOR CONVEYING A DRY GRANULAR MATERIAL

[76] Inventor: Gary Cipriani, 43000 W. Nine Mile Rd., Ste. 304, Novi, Mich. 48375-4129

[21] Appl. No.: 08/532,147

[22] Filed: Sep. 22, 1995

[51] Int. Cl.[6] .................................................. B65G 53/12
[52] U.S. Cl. ............................................. 406/85; 406/146
[58] Field of Search ................................. 406/10, 12, 14, 406/15, 16, 50, 85, 126, 132, 133, 146

[56] References Cited

U.S. PATENT DOCUMENTS 5,562,366  10/1996  Paulson ................................. 406/85 X

FOREIGN PATENT DOCUMENTS 164560  8/1964  U.S.S.R. ................................. 406/126

*Primary Examiner*—Andrew C. Pike
*Attorney, Agent, or Firm*—Charles W. Chandler

[57] ABSTRACT

A pneumatic pressure tank and valve system for pneumatically conveying a granular material to a destination can include a pressurizable chamber adapted to be filled with granular material through an upper inlet opening. When the chamber is filled, pressurized air is introduced into the chamber to lift a floating cone valve to a position closing the inlet opening. Pressurized air in the chamber conveys the granular material through an outlet opening toward the materials destination. The system operates on a very simple time cycle, while achieving effective use of the pressurized air for granular transport purposes.

5 Claims, 4 Drawing Sheets

5,967,704

PNEUMATIC APPARATUS FOR CONVEYING A DRY GRANULAR MATERIAL

BACKGROUND OF THE INVENTION

This invention is related to a device for pneumatically conveying dry solid powdered materials in batches at relatively low velocities.

Conventional apparatus for conveying dry granular or powderized product usually operate at 6–10 cycles per hour and require large volumes of air to meet design capacities.

If the conveying gas velocity is too low, the product will fall out of the airstream. On the other hand if the conveying gas velocity is too high, the product moves too fast, either causing damage to the product or the interior of the coveying system itself, or both.

SUMMARY OF THE INVENTION

The broad purpose of the present invention is to provide an improved apparatus for pneumatically conveying a dry product through a pneumatic conveying line. A pneumatic conveying line always consists of a network of horizontal and vertical piping, elbows, and couplings that when fitted together connect one three-dimensional coordinate at the infeed end of the required system with another three-dimension coordinate at the terminal end of the system.

The preferred embodiment of the invention comprises a pressure housing having a top inlet opening for receiving the dry granular product. Typically the product is fed by gravity through the top inlet opening. The product is allowed to fill the pressure chamber in the housing for a preset time, (usually 2–5 seconds) or as required.

A pneumatic control system then raises a conical conveying valve from the upper end of a vertical conduit by introducing pressurized air into the vertical conduit. The pressurized air raises the valve to close the product inlet opening, and to open the upper end of the vertical conduit. The incoming air is diverted within the pressure chamber to fluidize the solids to attain a mix ratio of at least 10 lbs. of solids with 1 lb. of air. The mix is then discharged through the bottom of the chamber into the conveying line. The product flows smoothly through the conveying line to its destination such as a receiving hopper. As the chamber is emptied, the air pressure in the chamber drops permitting the conical conveying valve to close the vertical conduit. The system then returns to the fill cycle. The timing controls control the length of the fill cycle so that sufficient air is available for the next conveying cycle.

The preferred apparatus utilizes compressed plant air supplies while minimizing air consumption. There are virtually no practical limitations on conveying distances, achievable conveying rates, or bulk densities using compressed air as a transporting medium. The apparatus has a minimum of moving parts, maintenance is quick and easy, dust collection requirements are reduced, and the apparatus is compact because the apparatus uses a minimum of volume of air for conveying the product.

Typical products that may be transported by the preferred apparatus may be calcium carbonate, silicon oxides, denture granules or granules of chemicals such as sulphur.

Still further objects and advantages of the present invention will become readily apparent to those skilled in the art to which the invention pertains, upon reference to the following detailed description.

BRIEF DESCRIPTION OF THE DRAWINGS

The description refers to the accompanying drawings in which like reference characters refer to like parts throughout the several views, and in which.

DETAILED DESCRIPTION OF THE PREFERRED EMBODIMENT

Figure 1:
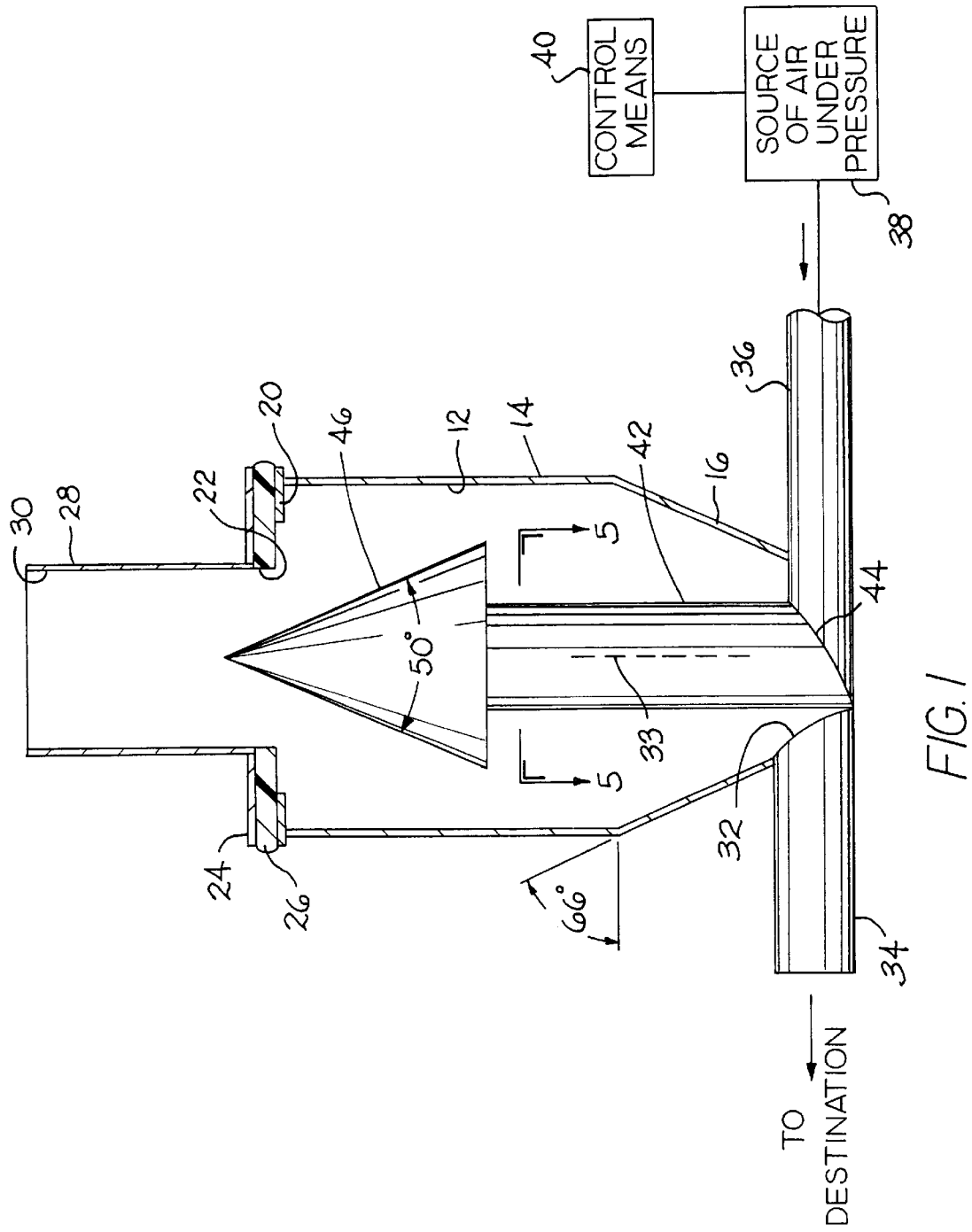
FIG. 1 is a partially sectional view of a pressure housing illustrating the invention.

Referring to the drawings, a preferred conveying apparatus includes a pressure housing 10 having an internal pressure chamber 12. The pressure housing preferably has a top cylindrical or barrel-shaped configuration 14 and a frusto-conical bottom 16. For illustrative purposes the apparatus will be described with reference to transporting a finely divided granular solid such as denture granules 18. The housing is formed of stainless steel. For illustrative purposes it may be about 17" high with the barrel-shaped portion having a diameter of about 10¾". The bottom conical portion of the housing includes an angle about 66°. The cone 46 has a conical angle about 50° as illustrated in FIG. 1.

The pressure housing has a top wall 20 with an opening 22. A cap 24 is mounted on the top wall and may be attached by any suitable means such as a quick-release clamp, not illustrated. An airtight seal between cap 24 and the housing is provided by an annular rubber-like seal 26.

The cap carries a tubular inlet 28 for receiving the product which is dropped by gravity through top inlet opening 30. The cap is also formed of stainless steel. Inlet opening 30 has a diameter of about 5¾" and a height of about 6¾".

Pressure housing 10 has a bottom discharge opening 32 attached to a horizontal 2" discharge conduit 34 employed for discharging the contents of the housing to the destination. As shown in FIG. 1, opening 32 is centered on a central axis 33 that coincides with the axis of chamber 12.

A 1½" diameter horizontal pipe 36 is attached to the opposite side of the housing. Supply conduit 36 is connected to a source of pressurized air 38 which is in turn controlled by suitable control means 40 which opens and closes the air supply to the housing during the filling and conveying cycles.

An upright conduit 42 having a 3" outside diameter and a 13" height is mounted in a vertical position in the housing extending upwardly through the discharge opening 32 on the axis 33, forming annular space around the conduit 42, and for illustrative purposes has a height of about 12". The lower end 44 of the upright conduit is fluidly connected to the end of supply conduit 36. The inside diameter of conduit 42 is 2¾". A valve 46 is mounted on the upper end 48 of conduit 42. The valve includes a conical valve head 50, aligned with inlet opening 30, attached to a tubular guide 52 and includes an annular seat 54. Tubular guide 52 is about 12" long and has an outside diameter of 2½" to form an annular air passage 56 between the upright conduit and the tubular guide. The valve is also formed of stainless steel.

The annular seat is about 2" above the bottom of the conical head. The conical head has a diameter at its base 58 which is greater than the diameter of the inlet conduit. The overall height and width of valve head 50 is such that the apex of the cone does not extend above the top of conduit 28. The valve head is moveable between an upper closed position, illustrated in FIG. 3, in which it blocks passage of the product through the top inlet opening, and a lower open position illustrated in FIG. 2 in which it permits the dry product to pass through the inlet opening and around the top surface of the conical portion of the valve head.

In the valve head's lower position, annular seat 54 blocks air flow through air passage 56. The valve also controls air passage through conduit 42. In its lower position, the valve blocks air through conduit 42 into the pressure chamber. In its upper position, the valve permits air to pass through annular passage 56 into the pressure chamber where the air fluidizes the product and then passes with the fluidized product through the discharge conduit 34 since the chamber 12 is entirely closed except at the discharge opening 32.

The weight of the valve is chosen so that it responds to a predetermined increase in air pressure in upright conduit 42 to rise from its lower position toward its upper position.

Typically the air pressure entering conduit 42 from source 38 will be about 11.5 p.s.i.

Figure 2:
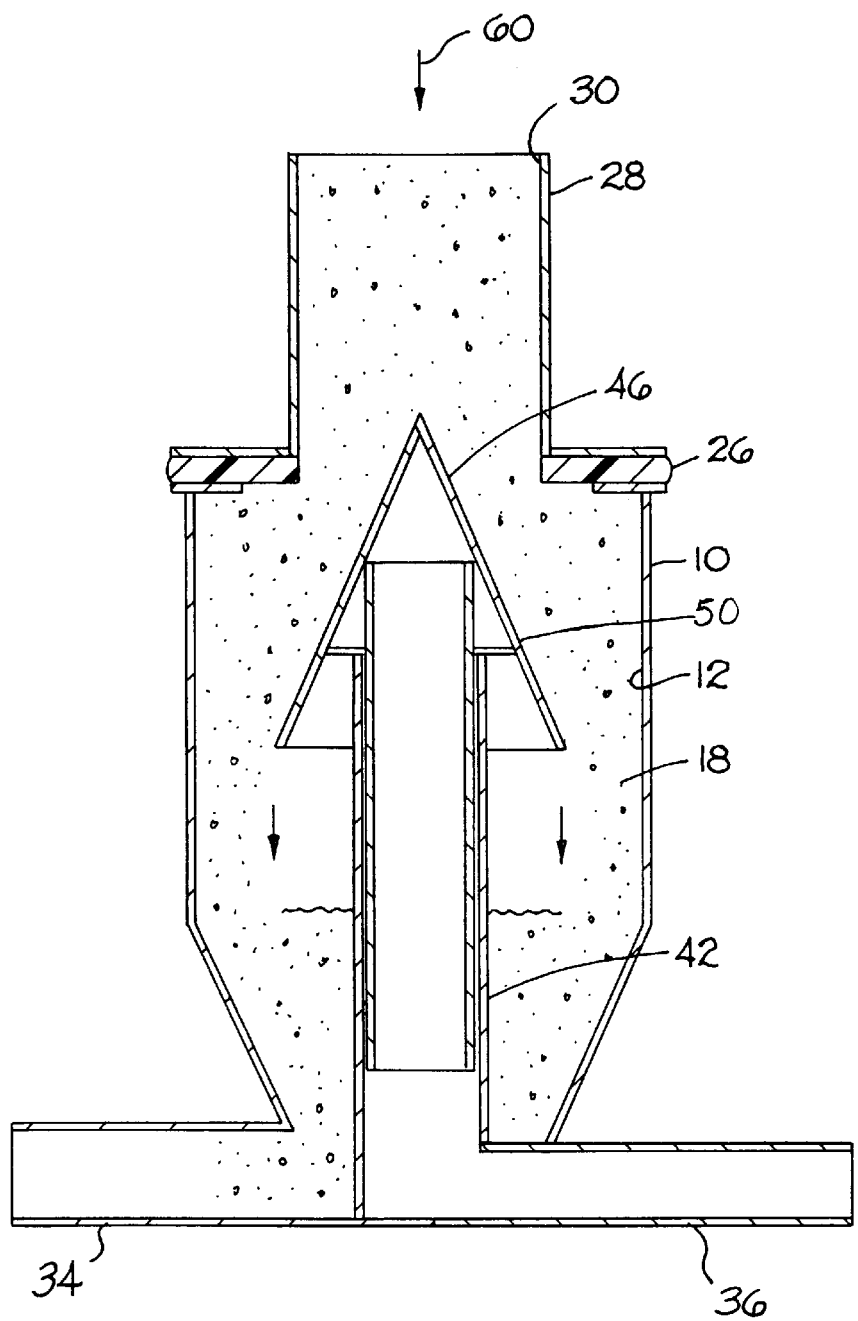
FIG. 2 is a view similar to FIG. 1 but illustrating the conical valve opened to receive the dry product to enter the pressure chamber.
Figure 3:
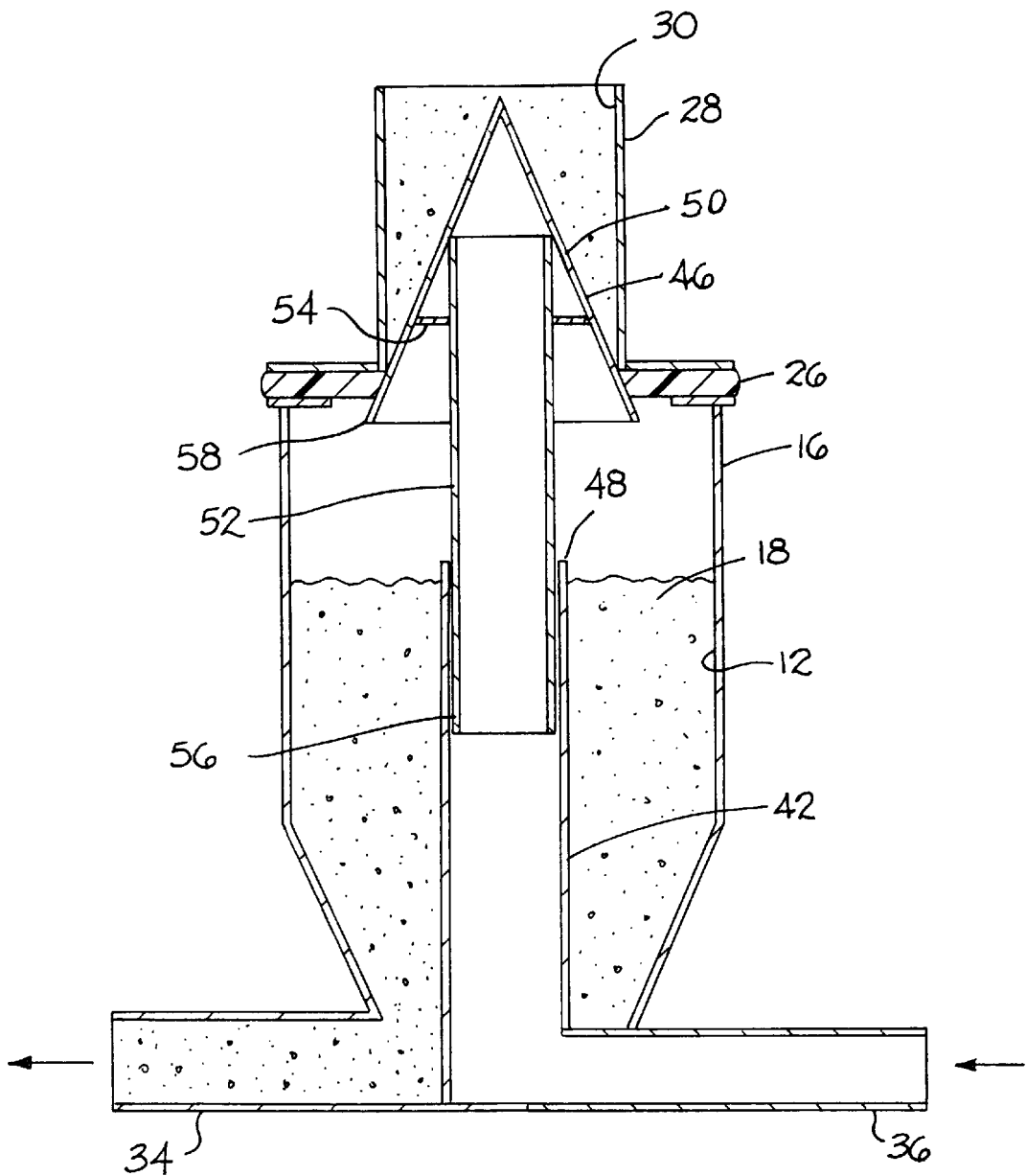
FIG. 3 is similar to FIG. 2 but showing the conical valve blocking further product from entering the pressure chamber, but opening the conveying air conduit.

The conveying cycle is as follows: FIG. 1 shows the pressure chamber empty with the valve in its open position. The product is then delivered from a source by gravity in the direction of arrow 60 as illustrated in FIG. 2. The dry granule or product drops down, striking the top of the conical valve and then passing into the interior of the pressure chamber. When the pressure chamber is about two-thirds full as illustrated in FIG. 3, a suitable signal from the control means causes air from source 38 to be introduced into conduit 42 causing valve 46 to rise until valve head 50 engages the central circular opening of annular seal 26 thereby preventing any further product from falling into the pressure chamber.

The incoming air, in addition to raising the valve, passes through annular passage 56 and fluidizes the product which then begins to exit through discharge conduit 34. The pressure continues to rise causing the product to flow smoothly through discharge conduit 34 to its destination. As the product is emptied from the pressure chamber, the air pressure in the pressure chamber begins to fall thereby permitting the valve to drop until seat 54 is disposed on the upper end 48 of the conduit 42, closing air passage 56.

Thus the valve is pressure-responsive because it responds to the pressure in the pressure chamber.

The control means controls the length of time of the fill cycle so sufficient air is available for the next conveying cycle.

Figure 4:
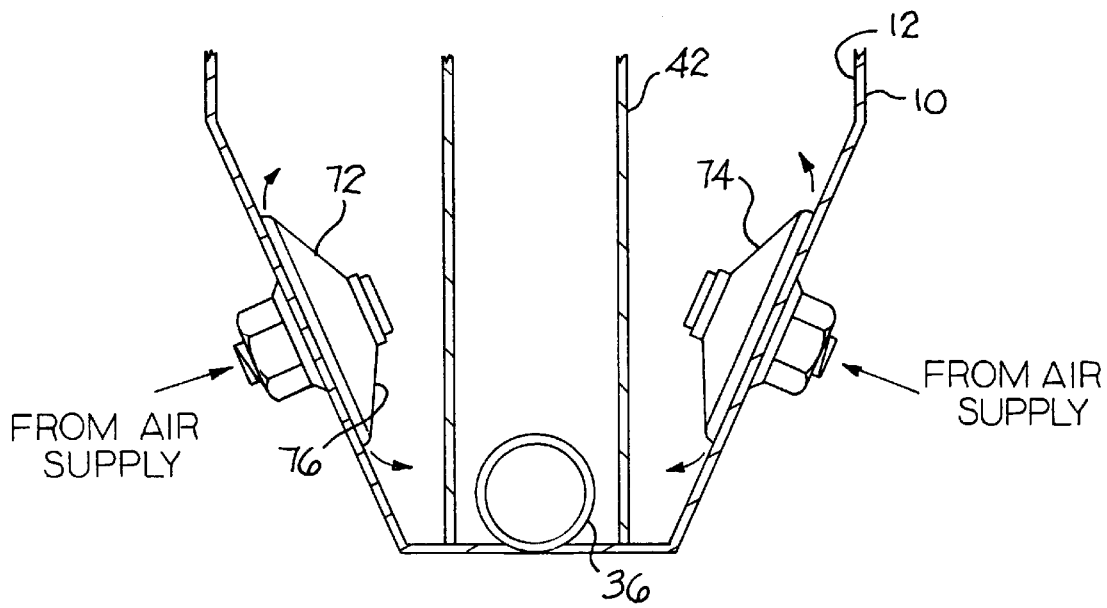
FIG. 4 is a fragmentary sectional view taken through another embodiment of the invention, taken at right angles to FIG. 3.
Figure 5:
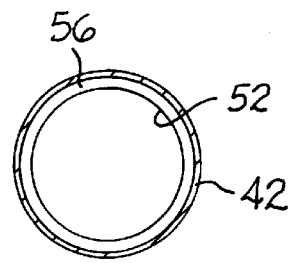
FIG. 5 is a view generally as seen along the lines 5—5 of FIG. 1.

Referring to FIG. 4, for some product it may be desirable to assist the air entering the upper part of the pressure chamber from conduit 42, to fluidize the product. A pair of conventional fluidizer mechanisms 72 and 74 is mounted in a frustoconical bottom portion of the housing and connected to a source of air supply which may be the connecting conduit 36. These devices have a resilient circular valve element 76 which opens in response to the air pressure to introduce air into the pressure chamber to fluidize the product. Although two fluidizers are illustrated, several may be mounted in various positions around the lower part of the pressure chamber.

In a typical apparatus, the pressure housing will have a capacity of about 0.5 cu. ft. and operates 6–10 cycles per minute. The same air received through conduit 36 has three functions: 1) to raise and lower the valve; 2) to convey the product; and 3) to fluidize the product in the pressure chamber.

Having described my invention, I claim:

1. Pneumatic apparatus for conveying granular material, said apparatus comprising:

chamber means (12) having an upper inlet opening for receiving granular material, a lower discharge opening (32), and a first discharge conduit (34) connected to said discharge opening;

a second upright air conduit (42) having an upper opening end (48) located below said inlet opening;

a valve (46) floatably positioned between the upper end of said second air conduit and said inlet opening;

a tubular guide (52) extending downwardly from said valve into said second conduit so that pressurized air can be delivered from said second conduit into the tubular guide to lift the valve to a position closing said inlet opening;

said tubular guide having a clearance with respect to said second conduit, whereby the pressurized air can flow from said second conduit through said clearance into said chamber means when said valve is in said position closing said inlet opening; and a cyclically operated air pressure source (38) for delivering said pressurized air to said second conduit.

2. The apparatus of claim 1, wherein said chamber means has a central axis;

said discharge opening (32) is centered on said axis; and said second upright air conduit (42) extends upwardly through said discharge opening on said central axis so that an annular space is provided around said second conduit.

3. The apparatus of claim 2, wherein said discharge opening (32) is larger than a cross-sectional dimension of said second upright air conduit whereby fluidized granular material can flow downwardly through said discharge opening in the space surrounding said second air conduit.

4. The apparatus of claim 1, wherein said valve (46) has an upwardly facing conical surface aligned with said inlet opening.

5. The apparatus of claim 1, wherein said chamber means is entirely closed except for said upper inlet opening and said discharge opening (32), whereby the pressurized air introduced to said chamber means through said air conduit is eventually discharged through said discharge opening.

* * * * *